(12) United States Patent
Kyrtsos et al.

(10) Patent No.: US 6,670,890 B2
(45) Date of Patent: Dec. 30, 2003

(54) THERMALLY ACTIVATED SENSOR SYSTEM

(75) Inventors: Christos T. Kyrtsos, Southfield, MI (US); Alan E. Tousignant, Clinton Township, MI (US)

(73) Assignee: Meritor Heavy Vehicle Technology LLC, Troy, MI (US)

( * ) Notice: Subject to any disclaimer, the term of this patent is extended or adjusted under 35 U.S.C. 154(b) by 272 days.

(21) Appl. No.: 09/769,802

(22) Filed: Jan. 25, 2001

(65) Prior Publication Data

US 2001/0033234 A1 Oct. 25, 2001

Related U.S. Application Data

(60) Provisional application No. 60/179,915, filed on Feb. 3, 2000.

(51) Int. Cl.[7] .............................................. G08C 19/12
(52) U.S. Cl. .................. 340/870.17; 340/584; 340/449; 73/660; 180/339; 180/379
(58) Field of Search ..................... 73/660; 340/679, 340/593, 594, 584, 870.17, 449; 180/339, 379

(56) References Cited

U.S. PATENT DOCUMENTS

| | | | | |
|---|---|---|---|---|
| 4,812,826 A | * | 3/1989 | Kaufman et al. | ........... 340/682 |
| 4,882,564 A | * | 11/1989 | Monroe et al. | ............. 340/449 |
| 5,107,247 A | * | 4/1992 | Malaca | ........................ 340/449 |
| 5,438,322 A | * | 8/1995 | Martin et al. | ................ 340/584 |
| 5,446,452 A | * | 8/1995 | Litton | ................... 340/870.17 |
| 5,555,457 A | | 9/1996 | Campbell et al. | |
| 5,625,337 A | * | 4/1997 | Medawar | ..................... 340/449 |
| 5,668,529 A | * | 9/1997 | Kyrtsos | ....................... 340/454 |
| 5,848,371 A | * | 12/1998 | Creger | ......................... 701/101 |
| 5,910,176 A | * | 6/1999 | Creger | ......................... 701/59 |
| 5,992,579 A | * | 11/1999 | Kyrtsos | ................... 188/79.52 |
| 6,216,812 B1 | * | 4/2001 | Pertusi | ........................ 180/339 |

FOREIGN PATENT DOCUMENTS

| | | |
|---|---|---|
| DE | 4224498 C1 | 1/1994 |
| EP | 0689950 A2 | 1/1996 |
| JP | 08057507 A  * | 3/1999 |
| WO | WO 95/22467 A1 | 8/1995 |
| WO | WO 0062029 A1 | 10/2000 |

OTHER PUBLICATIONS

U.S. patent application Ser. No. 09/515,551, filed Feb. 29, 2000, entitled "Drive Line Vibration Detection System".
Dallas Semiconductor DS1921, Thermochron iButton publication.
European search report, dated Feb. 24, 2003.

* cited by examiner

*Primary Examiner*—Michael Horabik
*Assistant Examiner*—Albert K. Wong
(74) *Attorney, Agent, or Firm*—Carlson, Gaskey & Olds

(57) ABSTRACT

A sensor system includes a housing that houses a thermally sensitive sensor, a transmitter portion and a power source. Preferably, the sensor device is encapsulated to protect the components from the environment. When the temperature in a component mounting the sensor system exceeds a preselected threshold, the thermostat sensor closes and the transmitter portion is energized by the power source to transmit a signal to a receiver unit.

16 Claims, 2 Drawing Sheets

THERMALLY ACTIVATED SENSOR SYSTEM

This application claims priority to U.S. Provisional Application No. 60/179,915, which was filed on Feb. 3, 2000.

BACKGROUND OF THE INVENTION

This invention generally relates to a temperature-based sensor for detecting undesirable vibrations or temperatures in a vehicle component.

Due to driving conditions and vehicle operation, many of the components undergo vibrations, which cause the components to deviate from the desired direction of movement. Further, many vehicle components must be maintained within particular temperature ranges to assure proper performance. It is therefore desirable to monitor the vehicle components to assure that they are operating in the proper temperature and vibration ranges to prevent undesirably worn or damaged components.

SUMMARY OF THE INVENTION

A sensor system according to the present invention includes a thermally sensitive sensor, a transmitter portion and a power source. Preferably, the sensor device is encapsulated to protect the components from the environment such that the sensor is mountable within a vehicle component. When the temperature in the component exceeds a preselected threshold, the sensor is activated and the transmitter portion is energized by the power source to transmit a signal to a receiver unit.

One disclosed embodiment of the sensor device provides a thermally sensitive sensor such as a thermostat that functions as a normally open switch. When the temperature in a component such as a universal joint exceeds a preselected threshold, the thermostat sensor closes and the transmitter portion is energized to transmit a signal to a receiver unit. An alert is then activated to notify an operator.

Another embodiment of the sensor includes a measurement-taking sensor portion. When the temperature exceeds a preselected threshold, the thermostat sensor closes and the measurement-taking sensor portion takes a measurement and transmits the measurement to a receiver unit. The measurement-taking sensor can provide a one-time measurement or continuous measurement until the power source is depleted.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
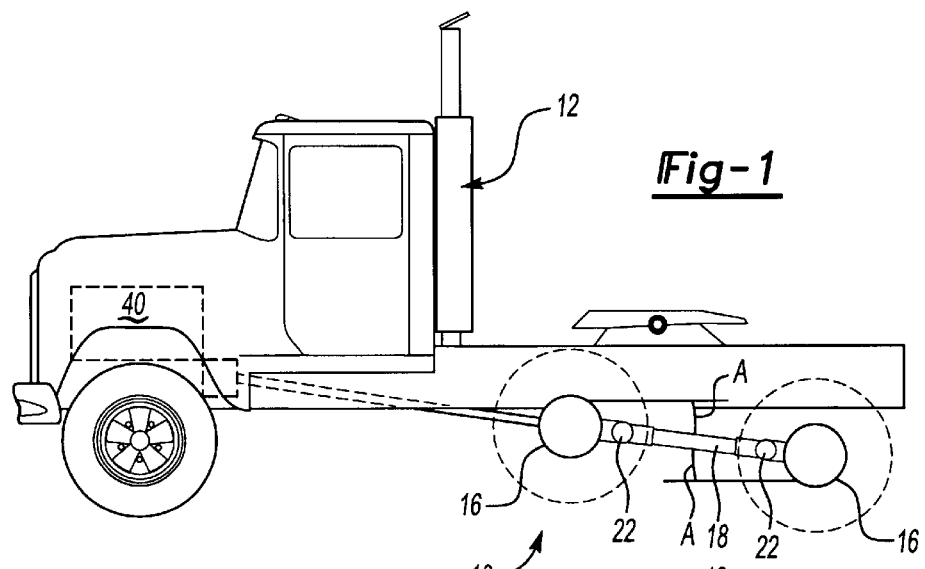
FIG. 1 diagrammatically illustrates a vehicle including a sensor arrangement designed according to this invention.

FIG. 1 illustrates a drive line system 10 for a vehicle 12. Drive lines include a series of components that move responsive to a motive force provided by an engine 14. The drive line system 10 in the disclosed embodiment includes a pair of differentials 16 connected by a driveshaft 18. Connectors 20 such as universal joints link the driveshaft 18 to each differential 16 while allowing movement along two axes.

In some vehicles, the differentials 16 are not parallel relative to the vehicle 10. The driveshaft 18 must therefore be mounted at an angle defined as an angle "A". This can produce more stress to connectors 20 which may result in elevated temperatures.

Figure 2:
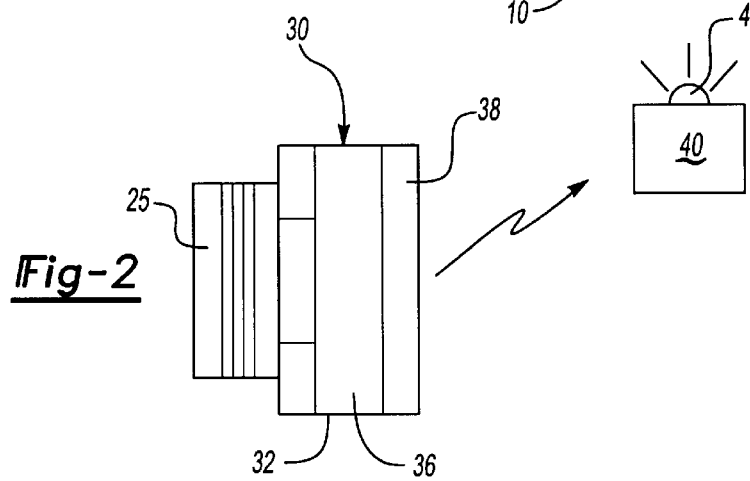
FIG. 2 diagrammatically illustrates a sensor designed according to this invention.

Referring to FIG. 2, the sensor device 30 includes a housing 32 that houses a thermally sensitive sensor 34, a transmitter portion 36 and a power source 38. Preferably, the sensor device 30 is encapsulated by the housing 32 to protect the components from the environment. Example temperature sensors include thermistors, RTD's, or thermocouples.

In one embodiment, the communication between the transmitter 36 and the receiver 40 is wireless. Example transmitters 36 include infrared, microwave or radio frequency signals to provide communication between the transmitter 36 and a receiver 40. When the receiver 40 receives a signal from the transmitter 36, it provides an output to a driver of the vehicle that the universal joint 22 has reached a critical temperature. The output can be a visible or audible signal for the driver such as schematically illustrated at 42.

Figure 3:
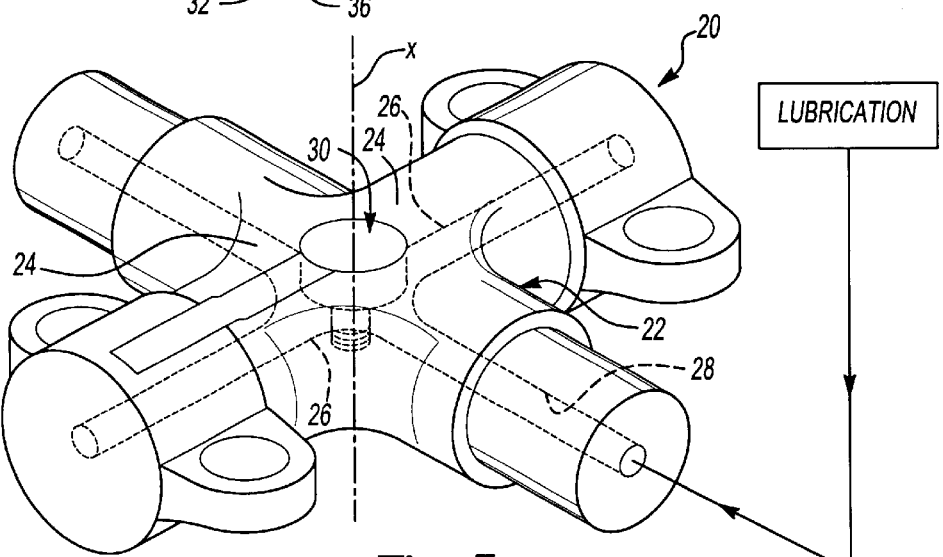
FIG. 3 diagrammatically illustrates a universal joint including a sensor arrangement designed according to this invention.

FIG. 3 illustrates a connector 20 such as a universal joint 22 which includes a central portion 24 and a multiple of trunions 26. The universal joint 22 includes lubrication channels 28 that allow lubricants to flow through the body of the universal joint 22. A sensor device 30 is positioned in the central portion 24 along an axis of rotation X of the universal joint 22 through a threaded section 25 of the sensor device 30. It should be understood that the sensor device 30 may thus be in contact with the lubrication flowing through the lubrication channels 28. Alternatively, the sensor device 30 may be separated from the lubricated channels 28.

The trunions 26 typically heat up during undesirable vibrations of the drive line components. In some instances, temperature increases may be most readily apparent in vehicles which include differentials 16 that are not parallel relative to the vehicle 10 (FIG. 1). This may result in more stress applied to the connectors 20.

This invention recognizes that individual trunions may reach a critical temperature before the central portion 24 reaches the same temperature because of the heat transfer properties of the universal joint structure. Therefore, the chosen thermally sensitive sensor 34 preferably operates to cause the transmitter 36 to provide a signal before any one of the trunions 26 reach a critical temperature.

In one example, a critical temperature is over 200° F. The temperature sensor 34 preferably responds to a temperature that is less than the critical temperature recognizing that a lower temperature across the central portion of the universal joint 22 is sufficiently high when at least one trunion has reached the critical temperature. In one example, a temperature of approximately 150° F. at the central portion is considered high enough to indicate a critical temperature at a trunion. When the temperature in the central portion 24 of the universal joint 22 exceeds a preselected threshold, the temperature sensor 34 closes and the transmitter portion 36 is energized by the power source 38 to transmit a signal to a receiver unit 40.

Figure 4:
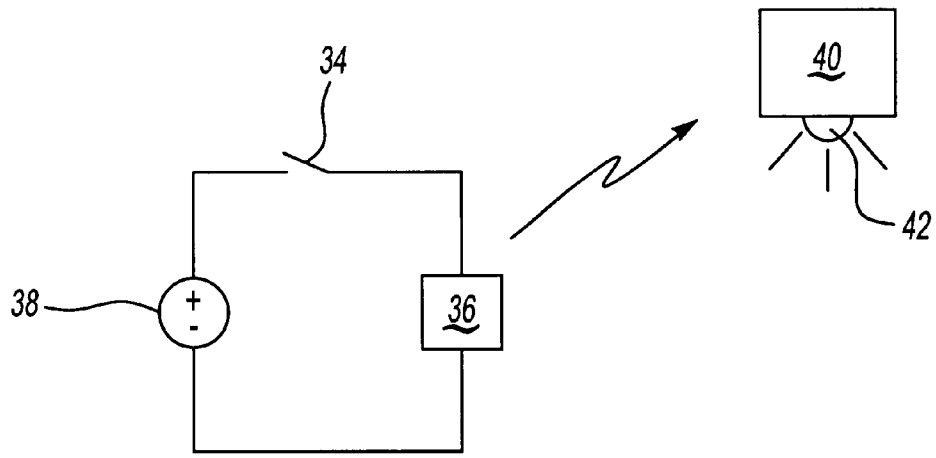
FIG. 4 schematically illustrates the sensor embodiment of FIGS. 1 and 2.

Referring to FIG. 4, one disclosed embodiment of the sensor device 30 provides the temperature sensor 34 as a thermostat that functions much like a normally open switch.

When the temperature in the central portion of 24 of the universal joint 22 exceeds a preselected threshold, the temperature sensor 34 closes and the transmitter portion 36 is energized by the power source 38 to transmit a signal to a receiver unit 40.

Figure 5:
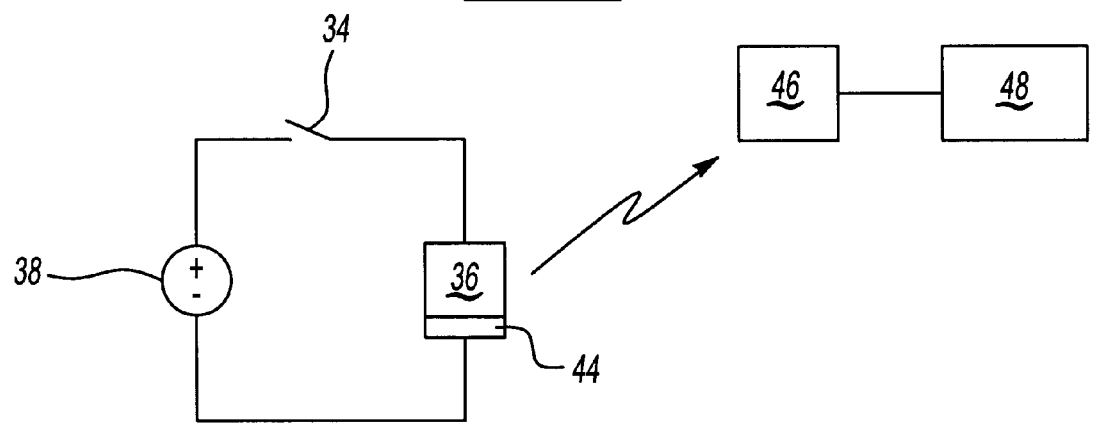
FIG. 5 illustrates another example sensor arrangement designed according to this invention.

Referring to FIG. 5, another sensor device 30' includes a measurement-taking sensor portion 44. When the a temperature exceeds a preselected temperature, the temperature sensor 34 closes such that the transmitter portion 36 and measurement taking sensor portion 44 are energized by the power source 38. The measurement-taking sensor portion 44 preferably takes a measurement and transmits that measurement as a signal to a receiver unit 46. The measurement-taking sensor 44 can provide a one-time measurement or continuous measurement until the power source is depleted. In this embodiment the signal is transmitted to the receiver unit 46 which is linked to an output 48 such as a display.

For example only, the sensor device 30' is located within a vehicle tire. When the a temperature exceeds a preselected threshold, such as when the tire pressure is low and addition friction is generated, the temperature sensor 34 closes such that the transmitter portion 36 and measurement taking sensor portion 44 are energized by the power source 38. The measurement taking sensor portion 44 will then measure the pressure in the tire and transmit the pressure via the receiver unit 46. The pressure is then displayed by the output 48 to alert an operator.

To maintain the sensor 30 in an operable state for long periods of inactivity, the transmitter 36 is preferably maintained in a dormant state until awakened by the thermostat sensor 34. Further, maintaining this dormant state allows the sensor 30 to be hermetically sealed as a unit. This necessity of an external power connection is eliminated which thereby allows the sensor 30 to be readily located in many small inaccessible locations such as drive line, axle, radiator, tire, and other vehicle components.

Of course, many other measurement-taking sensors are incorporated within the teachings of the present invention. The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A sensor system, comprising:
   a housing;
   a temperature sensor supported by said housing for detecting a predetermined temperature in a vehicle rotational connector;
   a transmitter that is supported by said housing, said transmitter for generating a radio frequency signal responsive to said temperature sensor; and
   a receiver located remotely from said housing that receives said transmitted radio frequency signal.

2. The system according to claim 1, wherein said temperature sensor is one of a thermistor, an RTD, or a thermocouple device.

3. The system according to claim 1, wherein said housing is hermetically sealed.

4. The system according to claim 1, wherein said vehicle connector comprises a universal joint.

5. The system according to claim 1, wherein said housing comprises a threaded section for mounting of the sensor system.

6. A universal joint assembly, comprising:
   a housing mounted at least partially within a central portion of a vehicle universal joint;
   a temperature sensor supported by the housing for detecting a predetermined temperature in said universal joint;
   a transmitter that is supported by said housing, said transmitter for generating a signal responsive to said temperature sensor; and
   a receiver located remotely from the housing that receives said transmitted signal.

7. The system according to claim 6, wherein said housing is mounted within a central portion of said universal joint.

8. The system according to claim 7, wherein said predetermined temperature is a temperature of approximately 150° F.

9. The system according to claim 6, wherein said housing is threaded into said central portion of said universal joint.

10. The system according to claim 6, wherein said housing is in communication with a lubrication channel within said universal joint.

11. The system according to claim 6, wherein said housing is located along an axis of rotation of said universal joint.

12. The system according to claim 6, wherein said housing is located remote from a plurality of trunions.

13. A method of detecting a predetermined temperature in a vehicle component comprising the steps of:
   (1) sensing a temperature in a central portion of a rotating vehicle connector;
   (2) identifying whether said temperature is a predetermined temperature; and
   (3) transmitting a signal in response to identifying said predetermined temperature in said step (2).

14. A method as recited in claim 13, wherein step (3) further including transmitting said signal to a remote receiver.

15. A method as recited in claim 14, further including the step of activating an alert in response to said signal.

16. A method as recited in claim 13, wherein step (1) further comprises sensing a temperature of a lubricant.

* * * * *